United States Patent
Uluyol et al.

(10) Patent No.: US 7,043,348 B2
(45) Date of Patent: *May 9, 2006

(54) TRANSIENT FAULT DETECTION SYSTEM AND METHOD

(75) Inventors: Onder Uluyol, Fridley, MN (US); Sunil K. Menon, Golden Valley, MN (US); Emmanuel O. Nwadiogbu, Scottsdale, AZ (US); Kyusung Kim, Minnetonka, MN (US)

(73) Assignee: Honeywell International, Inc., Morristown, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/379,413

(22) Filed: Mar. 3, 2003

(65) Prior Publication Data

US 2004/0176901 A1    Sep. 9, 2004

(51) Int. Cl.
*G06F 19/00* (2006.01)

(52) U.S. Cl. .................... 701/100; 701/29; 701/34; 701/99; 702/182; 702/185; 73/116; 73/117.2

(58) Field of Classification Search ............... 701/29, 701/99–100, 47–50, 34; 700/28–32; 702/108, 702/116, 182–185; 703/6–8, 22; 60/773, 60/793, 734; 706/116, 117.1; 73/116, 117.1, 73/117.2

See application file for complete search history.

(56) References Cited

U.S. PATENT DOCUMENTS

| | | | | |
|---|---|---|---|---|
| 4,249,238 | A * | 2/1981 | Spang et al. | 701/100 |
| 5,465,321 | A * | 11/1995 | Smyth | 706/20 |
| 5,485,908 | A * | 1/1996 | Wang et al. | 194/317 |
| 5,680,409 | A * | 10/1997 | Qin et al. | 714/799 |
| 5,937,366 | A * | 8/1999 | Zbytniewski et al. | 702/108 |
| 6,014,447 | A * | 1/2000 | Kohnen et al. | 381/86 |
| 6,393,355 | B1 * | 5/2002 | Muramatsu | 701/100 |
| 6,560,552 | B1 * | 5/2003 | Shen et al. | 702/56 |
| 2004/0030417 | A1 * | 2/2004 | Gribble et al. | 700/29 |
| 2004/0088991 | A1 * | 5/2004 | Gallant et al. | 60/772 |

* cited by examiner

Primary Examiner—Jacques H. Louis-Jacques
(74) Attorney, Agent, or Firm—Ingrassia Fisher & Lorenz

(57) ABSTRACT

A transient fault detection system and method is provided that facilitates improved fault detection performance in transient conditions. The transient fault detection system provides the ability to detect symptoms of fault in engine that occur in transient conditions. The transient fault detection system includes a feature extractor that measures sensor data during transient conditions and extracts salient features from the measured sensor data. The extracted salient features are passed to a classifier that analyzes the extracted salient features to determine if a fault has occurred during the transient conditions. Detected faults can then be passed to a diagnostic system where they can be passed as appropriate to maintenance personnel.

30 Claims, 10 Drawing Sheets

| | |
|---|---|
| ACCURACY | 0.86 |
| TRUE POSITIVE RATE | 0.89 |
| FALSE POSITIVE RATE | 0.18 |
| TRUE NEGATIVE RATE | 0.82 |
| FALSE NEGATIVE RATE | 0.11 |
| PRECISION | 0.89 |

FIG. 7

|  |  | EGT Principal Components |  |  |  |  | Speed Principal Components |  |  |  |  |
|---|---|---|---|---|---|---|---|---|---|---|---|
|  |  | 1st | 2nd | 3rd | 4th | 5th | 1st | 2nd | 3rd | 4th | 5th |
| EGT Principal Components | 1st | 0 | 0.09 | 0.11 | 0.08 | 0.06 | 0.12 | 0.1 | 0.07 | 0.07 | 0.069 |
|  | 2nd | 0 | 0 | 0.14 | 0.14 | 0.14 | 0.14 | 0.15 | 0.14 | 0.14 | 0.161 |
|  | 3rd | 0 | 0 | 0 | 0.14 | 0.14 | 0.13 | 0.15 | 0.14 | 0.14 | 0.126 |
|  | 4th | 0 | 0 | 0 | 0 | 0 | 0.14 | 0.15 | 0.13 | 0.14 | 0.158 |
|  | 5th | 0 | 0 | 0 | 0 | 0 | 0.12 | 0.14 | 0.15 | 0.14 | 0.147 |
| Speed Principal Components | 1st | 0 | 0 | 0 | 0 | 0 | 0 | 0.06 | 0.13 | 0.09 | 0.115 |
|  | 2nd | 0 | 0 | 0 | 0 | 0 | 0 | 0 | 0.15 | 0.15 | 0.124 |
|  | 3rd | 0 | 0 | 0 | 0 | 0 | 0 | 0 | 0 | 0.1 | 0.105 |
|  | 4th | 0 | 0 | 0 | 0 | 0 | 0 | 0 | 0 | 0 | 0.076 |
|  | 5th | 0 | 0 | 0 | 0 | 0 | 0 | 0 | 0 | 0 | 0 |

FIG. 8

|  |  | EGT Principal Components |  |  |  |  | Speed Principal Components |  |  |  |  |
|---|---|---|---|---|---|---|---|---|---|---|---|
|  |  | 1st | 2nd | 3rd | 4th | 5th | 1st | 2nd | 3rd | 4th | 5th |
| EGT Principal Components | 1st | 0 | 0.18 | 0.25 | 0.2 | 0.17 | 0.2 | 0.18 | 0.19 | 0.2 | 0.189 |
|  | 2nd | 0 | 0 | 0.45 | 0.45 | 0.44 | 0.25 | 0.38 | 0.45 | 0.45 | 0.455 |
|  | 3rd | 0 | 0 | 0 | 0.45 | 0.44 | 0.34 | 0.4 | 0.45 | 0.44 | 0.385 |
|  | 4th | 0 | 0 | 0 | 0 | 0.44 | 0.32 | 0.37 | 0.48 | 0.44 | 0.366 |
|  | 5th | 0 | 0 | 0 | 0 | 0 | 0.29 | 0.32 | 0.5 | 0.44 | 0.228 |
| Speed Principal Components | 1st | 0 | 0 | 0 | 0 | 0 | 0 | 0.16 | 0.43 | 0.31 | 0.187 |
|  | 2nd | 0 | 0 | 0 | 0 | 0 | 0 | 0 | 0.46 | 0.37 | 0.275 |
|  | 3rd | 0 | 0 | 0 | 0 | 0 | 0 | 0 | 0 | 0.41 | 0.376 |
|  | 4th | 0 | 0 | 0 | 0 | 0 | 0 | 0 | 0 | 0 | 0.288 |
|  | 5th | 0 | 0 | 0 | 0 | 0 | 0 | 0 | 0 | 0 | 0 |

FIG. 9

| NUMBER OF PRINCIPAL COMPONENTS | MSE "GOOD" DATA | MSE "BAD" DATA |
|---|---|---|
| 1 | 0.1190 | 0.2002 |
| 2 | 0.1481 | 0.2510 |
| 3 | 0.1415 | 0.2397 |
| 4 | 0.1240 | 0.2620 |
| 5 | 0.1170 | 0.1912 |
| 10 | 0.1548 | 0.2193 |
| 15 | 0.1247 | 0.2133 |

TRANSIENT FAULT DETECTION SYSTEM AND METHOD

FIELD OF THE INVENTION

This invention generally relates to diagnostic systems, and more specifically relates to fault detection during transient conditions.

BACKGROUND OF THE INVENTION

Modern aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircrafts fault detection system. Traditional engine fault detection has been limited to methods that are based on engine data collected at steady-state conditions. While these methods have been effective in detecting faults that exhibit symptoms during steady-state operation, they have been unable to effectively detect faults for which no symptoms arise during steady state conditions. For example, these methods are unable to effectively detect faults where the feedback control action in steady state suppresses the effect of sensor and system faults. Other faults may simply not manifest symptoms during steady state operation. Thus in all these case current fault detection systems are unable to consistently detect all potential faults that can effect the operation of the engine. This is particularly true for incipient faults that often are manifest only in engine startup characteristics.

Thus, what is needed is an improved system and method for detecting engine faults that occur in transient conditions, such as during engine startup.

BRIEF SUMMARY OF THE INVENTION

The present invention a transient fault detection system and method that provides improved performance. The transient fault detection system provides the ability to detect symptoms of fault in engine that occur in transient conditions. The transient fault detection system includes a feature extractor that measures sensor data during transient conditions and extracts salient features from the measured sensor data. The extracted salient features are passed to a classifier that analyzes the extracted salient features to determine if a fault has occurred during the transient conditions. Detected faults can then be passed to a diagnostic system where they can be passed as appropriate to maintenance personnel.

The transient fault detection system and method is particularly applicable to fault detection in turbine engines that occur during startup. In this application, the transient fault detection system monitors turbine engine sensor data during engine startup. The turbine engine sensor data from the engine startup is passed to the feature extractor. The feature extractor extracts salient features from the turbine engine sensor data. This extraction reduces the original turbine sensor data into a substantially reduced set of variables that can be used to detect startup failure. The extracted salient features are then passed to the classifier. The reduced set of variables in the extracted salient features allows the classifier to efficiently analyze the data for symptoms of startup failure and accurately classify the performance of the turbine engine during start up. Thus, the transient fault detection system provides improved fault detection for transient engine conditions.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 7 is a table illustrating exemplary results of a neural network based classifier;

FIGS. 8 and 9 are tables that illustrate the mean-squared error when various combinations of principal components are used by an exemplary neural network classifier;

FIG. 10 is a table that illustrates the mean-squared error when different numbers of principal components are used by an exemplary neural network classifier.

DETAILED DESCRIPTION OF THE INVENTION

The present invention a transient fault detection system and method that provides improved performance. The transient fault detection system provides the ability to detect symptoms of fault in engine that occur in transient conditions. The transient fault detection system includes a feature extractor that measures sensor data during transient conditions and extracts salient features from the measured sensor data. The extracted salient features are passed to a classifier that analyzes the extracted salient features to determine if a fault has occurred during the transient conditions. Detected faults can then be passed to a diagnostic system where they can be passed as appropriate to maintenance personnel.

Figure 1:
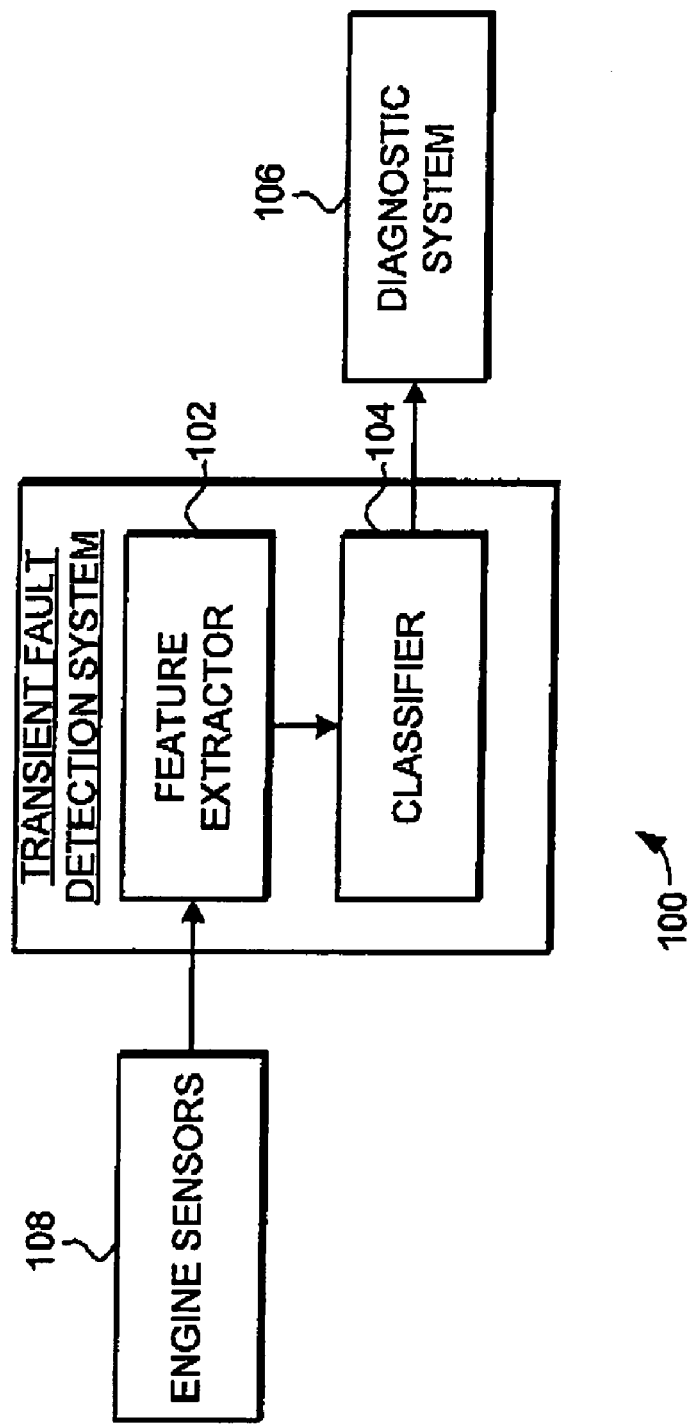
FIG. 1 is a schematic view of a transient fault detection system.

The transient fault detection system and method is particularly applicable to fault detection in turbine engines. Turning now to FIG. 1, a transient fault detection system 100 for engine systems is illustrated. The transient fault detection system 100 includes a feature extractor 102 and a classifier 104. The turbine engine sensor data from the engine sensors 108 is passed to the feature extractor 102. The feature extractor 102 extracts salient features from the turbine engine sensor data. This extraction reduces the original turbine sensor data into a substantially reduced set of variables that can be used to efficiently detect startup problems. The extracted salient features are then passed to the classifier 104. The reduced set of variables in the extracted salient features allows the classifier 104 to efficiently analyze the data for symptoms of startup failure and accurately classify the performance of the turbine engine during start up. The results of the classification are then passed to a diagnostic system 106, where they can be relayed to a user, or subject to further analysis.

As stated above, the feature extractor 102 extracts salient features from the turbine engine sensor data. This extraction results in a reduction in the dimensionality of the input data. At the simplest level, this may involve discarding a subset of the original sensor data. Other types of feature extraction include forming linear or nonlinear combinations of the original sensor data to generate new variables. The new variables extracted from the original sensor data comprise features, and the process of generating the features is in general called feature extraction. The resulting features has fewer adaptive parameters to be determined, and thus are more likely to be properly constrained by a data set of limited size, leading to a network with better generalization properties, and one that may be faster to train.

The feature extractor 102 can be implemented with a wide variety of systems and methods. In one embodiment, the feature extractor performs a principal component analyses (PCA) on the engine sensor data to extract salient features from the engine sensor data. PCA is a feature extraction method that linearly transforms an original set of variables into a substantially smaller set of uncorrelated variables. The substantially smaller set of uncorrelated variables represents the information in the original set of variables. The general goal of the dimension reduction is to achieve a more efficient combination of the original features.

As one detailed example of a PCA, it can be shown that the optimal linear solution for representing n-dimensional vectors X in an m-dimensional space, where m<n, is to project X onto the surface spanned by the m largest eigenvectors of the covariance matrix. By projecting onto the principal subspace, PCA minimizes the squared reconstruction error and maximizes the separation of data clusters.

In a particular example, let X denote an n-dimensional vector having zero mean. The linear feature extraction can be written as:

$$Y = F^T X \qquad \text{Equation 1.}$$

In which Y is an m-dimensional feature vector and F is an nxm matrix built from m orthogonal n-dimensional vectors. If the original n-dimensional feature space is linearly reconstructed from the extracted m-dimensional feature vectors, the approximation of the vector X can be written as:

$$\hat{X} = FY = FF^T X \qquad \text{Equation 2.}$$

The information lost in this projection, which is the measure of the performance of the feature extraction, can be written as:

$$MSE = E(|X - \hat{X}|^2) \qquad \text{Equation 3.}$$

In which E is the expectation operator. Since the vectors in F are orthogonal, it can be rewritten as:

$$MSE = E(X^T X - X^T F F^T X) \qquad \text{Equation 4.}$$

Minimizing the reconstruction error means rotating the orthogonal vectors in F to the directions of the largest variance. Therefore, PCA finds a projection onto a subspace spanned by the m largest eigenvectors of the covariance matrix. Geometrically, the first principal component is the axis of closest fit to the observations. Projecting the observations on this axis generates a new variable, and its variance is the maximum among all possible choices of this axis. The second principal component is another axis, perpendicular to the first axis. Projecting the observations on the second axis generates another new variable whose variance is the maximum among all possible choices of this second axis.

It should be noted that a principal component analysis results in one or more extracted principal components derived from the original sensor data set. For example, a PCA analysis can extract five principal components from a first sensor data set, and five principal components from a second sensor data set. Which of these principal components are used by the classifier would generally depend upon the details of a specific application. For example, some applications may benefit from using multiple principal components from each data source, while others may only require one principal component to effectively classify the transient behavior. As will be described in more detail below, it is generally desirable to optimize the selected combination of principal components that are used in the classifier. This can be done by varying the number and order of the components used, and testing the results to determine the effect on the fault detection performance.

PCA is thus one method of extracting salient features from the turbine engine sensor data, reducing the original turbine sensor data into a substantially reduced set of variables that can be used to efficiently detect startup problems. Of course, other systems and methods can also be used to extract features from the sensor data. For example, signal decomposition techniques such as wavelets and independent component analysis (ICA), or clustering techniques can also be used as a feature extractor. In each of these implementations, the feature extractor 102 results in a reduced set of variables from the original sensor data. The reduced set of variables in the extracted salient features allows the classifier 104 to efficiently analyze the data for symptoms of startup failure and accurately classify the performance of the turbine engine during start up.

In one embodiment of the transient fault detection system 100 the classifier 104 comprises a neural network based classifier. The neural network based classifier uses a neural network to classify the extracted salient features to determine whether or not a fault has occurred. The results of this classification can be passed to a diagnostic system, where they can be relayed to a user, or subject to further analysis.

In one embodiment, the classifier 104 comprises a multilayer perception (MLP) neural network. MLP neural networks are desirable for use as classifier 104 because of their ability to classify based on complex pattern recognition. MLP is a neural network architecture particularly suitable for classification problems. MLP neural networks use input, hidden, and output layers which are connected to each other in a feedforward manner with a set of weights. There are a number of tools available to implement MLP neural networks, including Neural Network Toolbox from Matlab.

Of course, a neural network is just one example of the type of systems that can be used to implement a classifier 104. Other examples of classifiers that can be used include data driven classifiers using support vector machines (SVM) or Fisher's Discriminant Analysis, and probability based classifiers using the Bayesian approach.

Of course, a neural network is just one example of the type of systems that can be used to implement a classifier.

Figure 2:
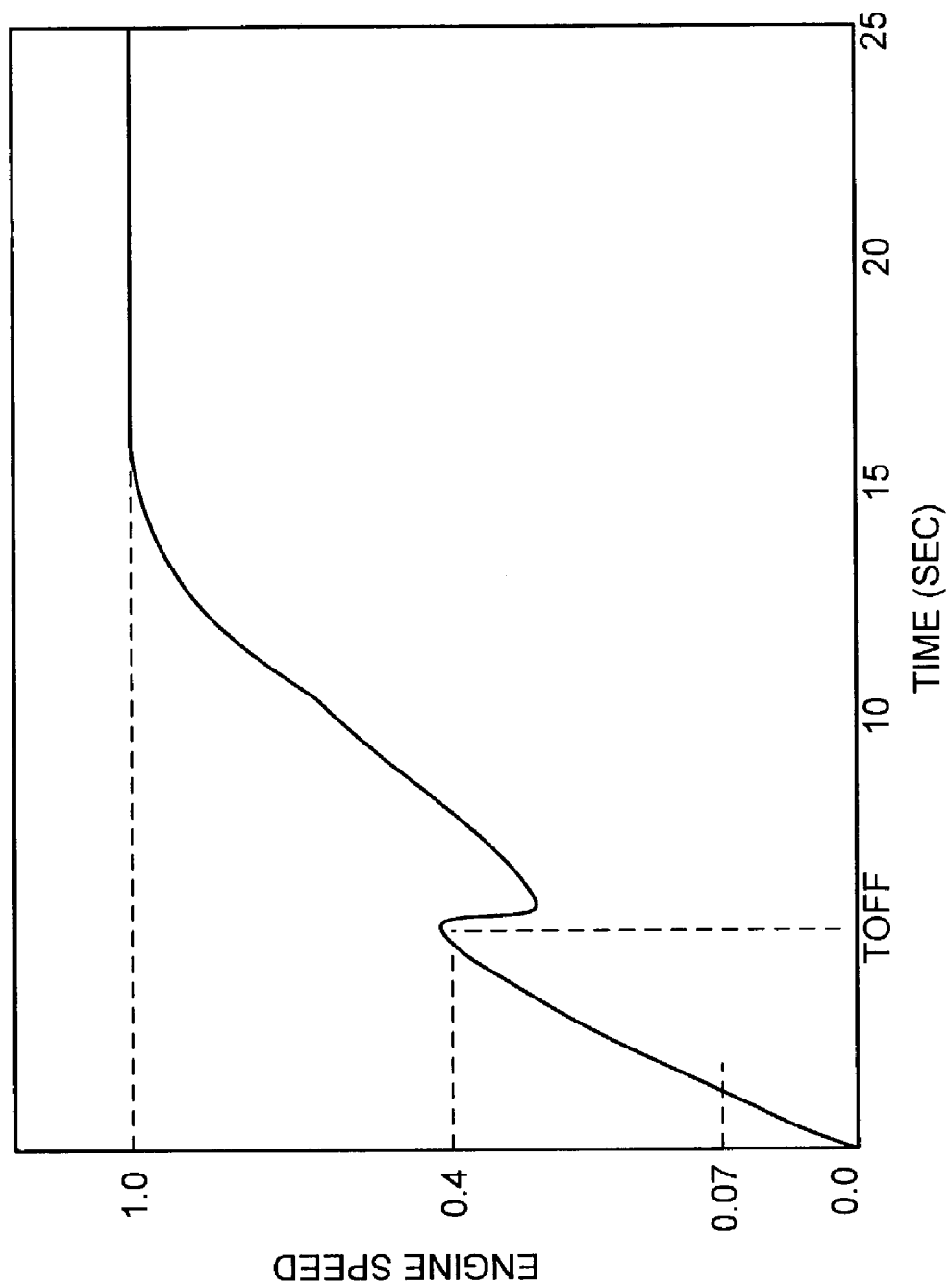
FIG. 2 is an exemplary plot of turbine engine speed during engine startup.

Other examples of classifiers that can be used include data driven classifiers using support vector machines (SVM) or Fisher's Discriminant Analysis, and probability based classifiers using the Bayesian approach The transient fault detection system can be used to detect faults that occur in a wide variety of transient conditions. One area of particular applicability is in turbine engine startup. Other areas of applicability include during engine traverse from ground idle to max speed and from flight idle to cruise. Turning now to FIG. 2, a typical turbine engine speed plot during engine startup is illustrated. FIG. 2 illustrates engine speed (as a percentage of full engine speed) as a function of time from startup. The startup sequence proceeds as follows: The starter begins to rotate the engine compressor and the igniter is switched on, causing the igniter plugs to start firing. At about 7% (0.07) of full engine speed the igniter system is turned on. As the ignition system successfully completes light-off, the combustor is able to sustain combustion. The exhaust gas temperature (EGT) rises sharply at light-off. This rapid increase in EGT provides the indications that light-off has occurred. The engine starter continues to provide rotational torque to the engine as the engine speed continues to increase. The engine turbine then begins to provide rotational energy to the system. At about 40% engine speed, the starter system is shut off (time TOFF in FIG. 2). There is a momentary drop in engine speed, as seen in FIG. 2, due to the drop in rotational torque when the starter is shut off. The engine power section has then completely taken over responsibility for bringing the engine to full speed (or the required speed set point).

There are several problems that can arise during startup. For example, during the first phase of startup, until light-off has occurred, igniter system degradation can negatively impact startup and will manifest more strongly than at other times. Between 7% and 40% speed, starter faults are manifest more strongly than at other times of the startup. In the final phase, from the time the starter shuts off and the engine rotates on its own power, the effects of power section degradation are most evident. The effects of starter degradation propagate (in terms of start times) forward in time during the start cycle, but the engine power section effects dominate after the 40% speed mark (after the starter has been turned off).

Figure 3:
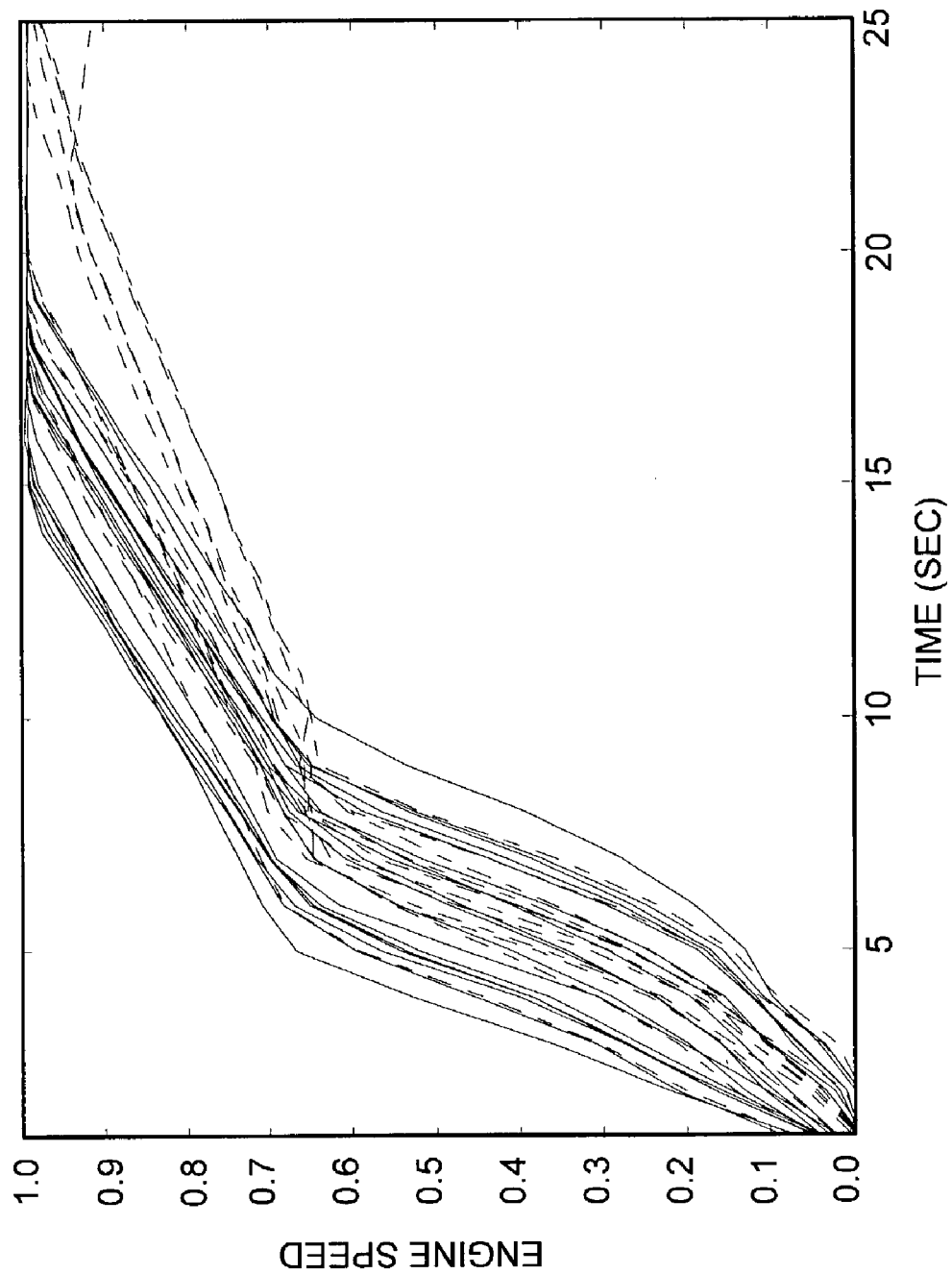
FIG. 3 is an plot of engine speed during 29 exemplary engine startups.
Figure 4:
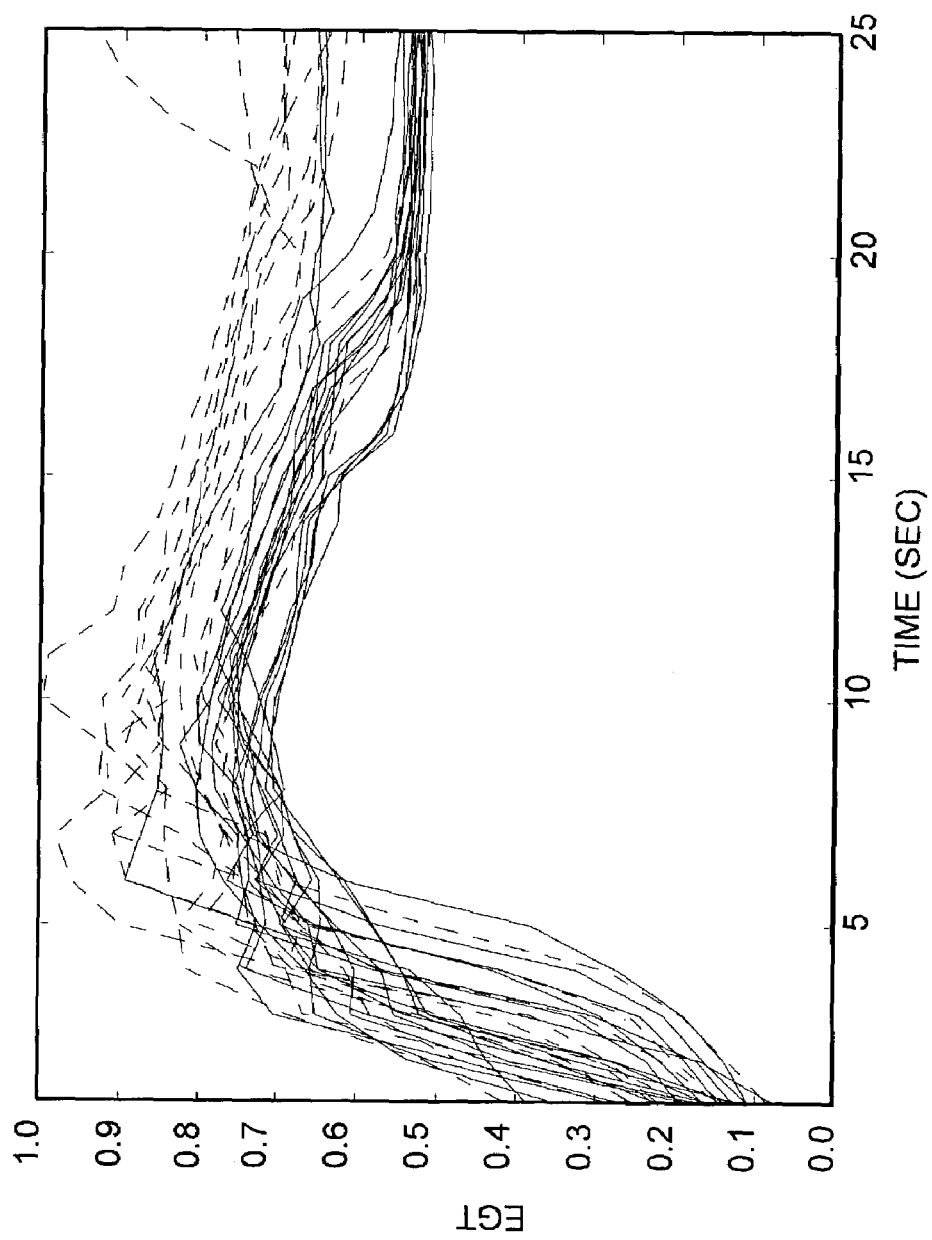
FIG. 4 is a plot of EGT during 29 exemplary engine startups.
Figure 5:
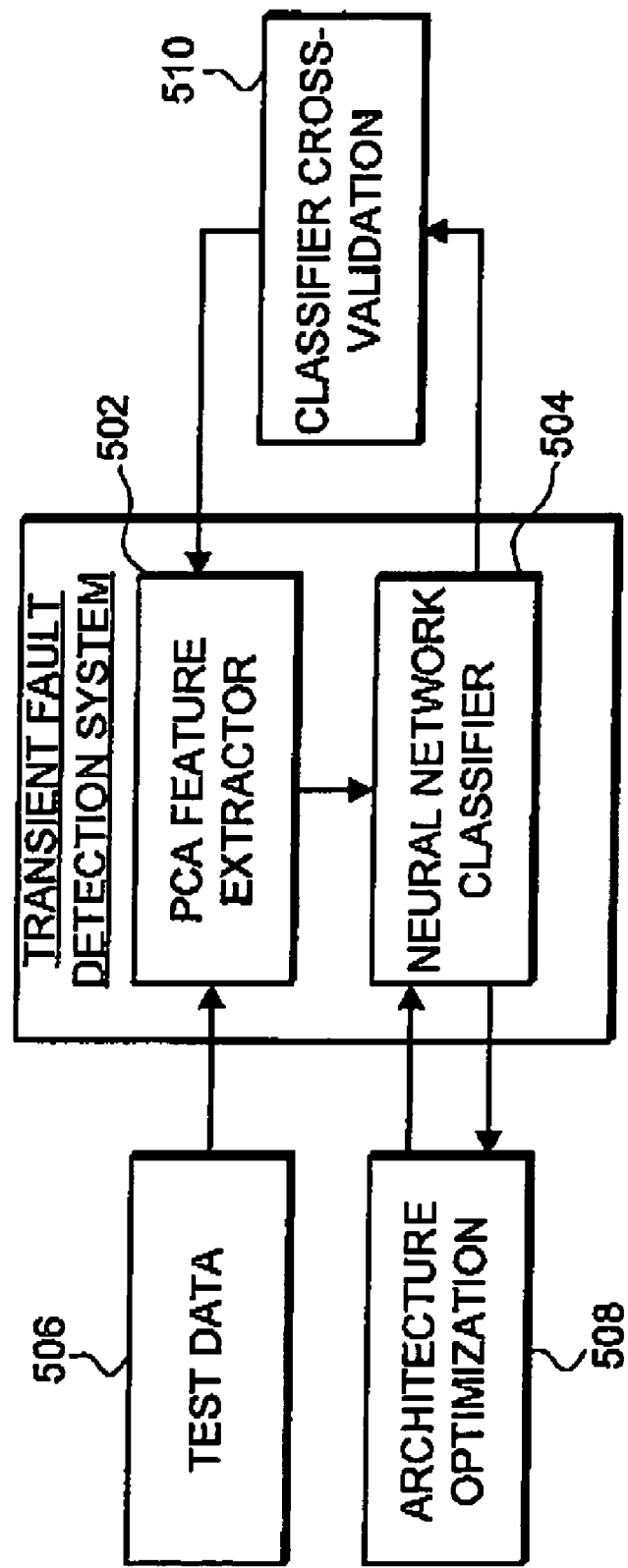
FIG. 5 is a schematic view of a training system for a transient fault detection system that uses a neural network based classifier.
Figure 6:
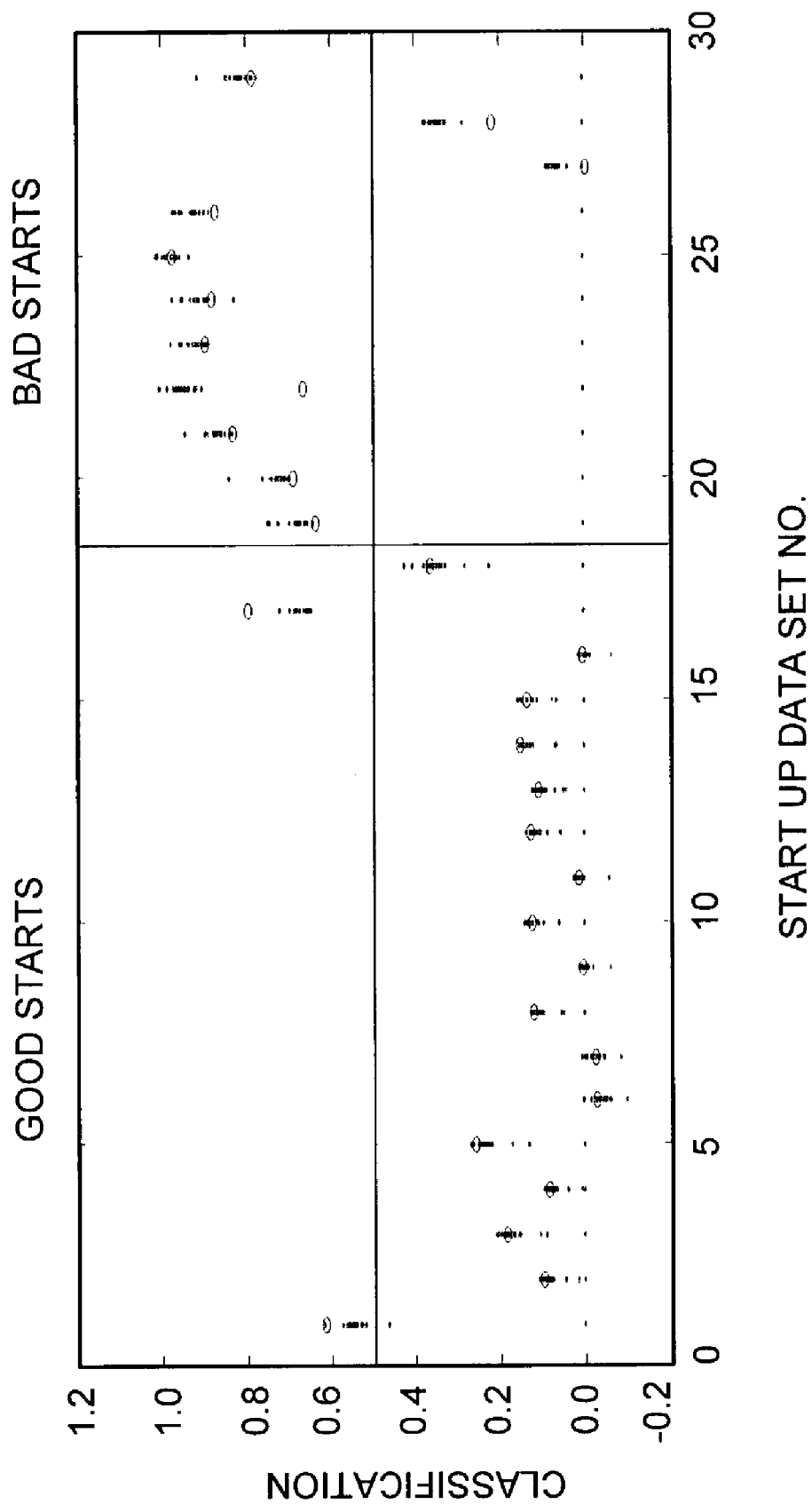
FIG. 6 is a plot illustrating exemplary training of a neural network based classifier.

Turning now to FIGS. 3–10, a detailed example of a transient fault detection system used for startup fault detection in a turbine engine will now be discussed. FIGS. 3 and 4 illustrate exemplary EGT and speed sensor data sets that are exemplary of a turbine engine during startup. FIG. 5 illustrates the training and testing of transient fault detection system that uses a neural network based classifier. FIGS. 6 and 7 illustrate the results of training and cross-validating an exemplary neural network based classifier using the EGT and speed sensor data from FIGS. 3 and 4. FIGS. 8 and 9 illustrate the mean-squared error when various combinations of principal components are used by a neural network classifier. Finally, FIG. 10 illustrates the mean-squared error when different numbers of principal components are used by a neural network classifier.

In the example of FIGS. 3–10, the transient fault detection system is used to detect problems in turbine engine. Furthermore, in this detailed example, the feature extractor utilizes PCA to extract salient features from the engine sensor data. In this example, the extracted features are then passed to a neural network based classifier that determines if any problems in the engine occurred during startup. Again, these are just one example of the type of feature extraction and classifier that can be used in the transient fault detection system. Furthermore, in this example, sensor data used by the transient fault detection system includes engine gas temperature (EGT) data and engine speed data taken during engine startup. Of course, EGT and engine speed data are just two examples of the type of engine sensor data that can be used in the transient fault detection system.

Turning now to FIGS. 3 and 4, exemplary EGT and engine speed sensor data is illustrated. The exemplary sensor data shows the type of data that can be used in the transient fault detection system. Specifically, the data can be used to train and test the transient fault detection system, with the result being a transient fault detection system that can accurately determine when startup faults are occurring.

The exemplary EGT and engine speed data illustrated in FIGS. 3 and 4 result from engine sensor data being recorded from startup to full operating speed, at a rate of one sample per second. In FIGS. 3 and 4, the sensor data from 29 starts are illustrated. Included in this data are eighteen "good" starts and 11 "bad" starts, with the good starts illustrated with a sold line, and the bad starts illustrated with a dotted line. It should be noted that these starts are known to be "good" or "bad" because of additional data that is available in the testing environment. This additional data can include things such as compressed air pressures, both at the source and after valve modulations. For example, the starts in which systems functioned normally are classified as the "good" starts. In other starts, the air pressure modulating valve, a component in the engine start system, had mechanical failures, and these are the starts that are classified as "bad". It should also be noted that the additional data available in the testing environment that may not be available when the engine is installed and in use on the aircraft. Instead, these known good and bad starts are used to train and test the transient fault detection system, resulting in a system that can accurately detect faults based on the EGT and speed sensor data, and without the additional data that is only available in a testing environment.

It should also be noted that these 29 exemplary starts do not include any starts where the modulating valve failures were so advanced that the engine failed to start at all—so called "hung" starts. Instead, the bad starts are those starts that resulted in failures that were not yet advanced enough to cause a hung start, but are at a beginning to intermediate stage.

FIGS. 3 and 4 illustrate that many of the bad start profiles are similar to the good start profiles. This indicates that many of the startup failures are subtle and therefore difficult to detect and diagnose. As will become clear, by using suitable feature extractor and a trained neural network classifier, these starts can be consistently classified based on EGT and speed data even though the bad start profiles are similar to the good start profiles.

In the detailed example, the engine speed and EGT data are first processed by the feature extractor using the PCA method. The principal components of the speed and EGT data are the features that are used to train the neural network based classifier. Training teaches the neural network based classifier how to classify a start based on the feature extracted speed and EGT data. Thus, a properly trained neural network based classifier can be used to evaluate the performance of an engine start based on speed and EGT data even though the good and bad start profiles are substantially similar, as illustrated in FIGS. 3 and 4. A properly trained neural network based classifier can thus consistently determine whether a good start or a bad start has occurred.

Turning now to FIG. 5, a transient fault detection system 500 that includes a neural network based classifier 504 and PCA feature extractor 502 is illustrated, including the techniques that could be used to train, test and optimize the system. Specifically, the transient fault detection system 500 is trained and optimized using test data 506, classifier cross-validation 510 and architecture optimization 508. The test data 506 provides the data that is used to train and test the system, with classifier cross-validation 510 being used to evaluate the performance of the classifier. Architecture optimization 508 is used to determine the number of layers and number of nodes in the neural network to optimize the neural network architecture.

As stated above, the test data would preferably include good and bad start test data sets, such as those illustrated in FIGS. 3 and 4. The test data can be used to train the neural network based classifier using any suitable technique. One suitable method of training the neural network based classifier is to use the leave-one-out (LOO) method as a cross-validation technique. The LOO method is particularly effective when the number of data sets for training is limited. In this method, the data set does not have to be partitioned into training and testing data sets. Instead, in the LOO method the data set is trained on one data point less (hence the method's name) and repeated for all the different sets of data. The results of the separate neural network runs are then averaged, and the resulting classifier performance can be evaluated. As one example, the neural network targets are set at 0 for no-fault condition, and 1 for a fault condition. The neural network is then trained using Bayesian Regulation backpropagation, which combines the fast convergence properties of Levenberg Marquardt algorithm with Bayesian regularization to achieve good generalization.

In addition to training and cross-validation, the neural network architecture is preferably put through architecture optimization to optimize the structure of the neural network based classifier. The architecture optimization varies the structure of the classifier, such as the number of hidden layers and the number of nodes in each layer. The performance of the neural network classifier is evaluated as the structure is varied to determine the network size that leads to the best performing classifier.

In addition to the above optimizations, the number and order of the principal components used by the classifier, of both the engine speed and the EGT can be optimized. As stated above, a principal component analysis results in one more extracted principal components derived from the original sensor data set. Different combinations of these extracted features can be used by the classifier. To optimize the selected combination of components that are used in the classifier, the number and order of the components used are varied and tested to determine the effect on the neural network classifier performance. This is to determine the combinations of principal components of engine speed and EGT that yield the best performing fault classifiers. Turning now to FIG. 6, the results of an exemplary training of a neural network classifier is illustrated. The example in FIG. 6 illustrates the neural network classifier that was trained using the first principal component of EGT data and the third principal component of engine speed data. In FIG. 6, the classifier training results are shown as small solid circles and the test result is shown as a larger open circle. As in the example discussed above, a neural network output of 0 signifies a "good" start and an output of 1 signifies a "bad" start. In the figure, a value of 0.5 on the classification axis (y-axis) is set to be the threshold separating the engine starts classified as "good" from ones classified as "bad". The first 18 points of data on the x-axis represent the data from starts that were good. The remaining 11 data points represent the data from starts that were bad.

As can be seen in FIG. 6, the exemplary neural network classifier was able to accurately classify 16 out of the 18 good starts as good. Likewise, the neural network classifier was able to accurately classify 9 out of the 11 bad starts as bad. Turning now to FIG. 7, a table 700 illustrates the results of the cross-validation performed for this example. Accuracy is defined as the proportion of the total number of classifications that were correct. In the example shown it is 25 out of 29, which is 86 percent. True Positive Rate is defined as the proportion of the good starts that were correctly classified. This is 16 out of 18, which corresponds to 89 percent. False Positive Rate is defined as the proportion of the bad starts that were classified as good, which is 2 out of 11, or 18 percent. True Negative Rate is defined as the proportion of the bad starts that were classified correctly, which is 9 out of 11, or 82 percent. False Negative Rate is defined as the proportion of good starts that were classified as bad, which is 2 out of 18, or 11 percent. Finally, Precision is defined as the proportion of the good starts that were classified correctly, which is 16 out of 18, or 89 percent.

One measure of how well a classifier performs is the average mean-square error (MSE). Turning now to FIG. 8, a table 800 illustrates the MSE of the exemplary neural network classifier on the "good" start data using various combinations of principal components. Likewise, in FIG. 9, table 900 illustrates the MSE of the exemplary neural network classifier on the "bad" start data using the same combinations of principal components. The rows and columns in tables 800 and 900 correspond to the two principal components used by the classifier, with the MSE given at the intersecting cell. As an example, for table 800, the cell in row 1 and column 2 corresponds to a neural network classifier that uses the first and second EGT principal components, and it results in an MSE of 0.09. Likewise, in the cell in row 5, column 6 corresponds to a neural network classifier that uses the fifth EGT principal component and the first speed principal component, and it results in a MSE of 0.12.

Table 800 shows that the best neural network classifier results were obtained for the good start data when the first principal component of the EGT data was paired with any of the speed principal components, except for the first. A similar result is shown in table 900 for the bad start data.

Another optimization that can be performed on the neural network classifier is the number of principal components used as inputs. Turning now to FIG. 10, the MSEs of an exemplary neural network classifier, with varying number of engine speed and EGT principal components, are illustrated in table 1000. Table 1000 shows that increasing the number of principal components has mixed results in neural network classifier performance. Specifically, the performance declines, and then increases when the number of principal components is five, and then declines again. As this is not a clear trend, it does show that increasing the number of principal components does not necessarily improve performance. In fact, increasing the number of principal components increases the complexity of the neural network classifier. Generally, the number of nodes in hidden layers and the number of hidden layers increases as there are more inputs to the neural network. Thus, the change in classifier performance should be weighed against the increase in the complexity of the neural network classifier when the number of the principal components is increased.

Figure 11:
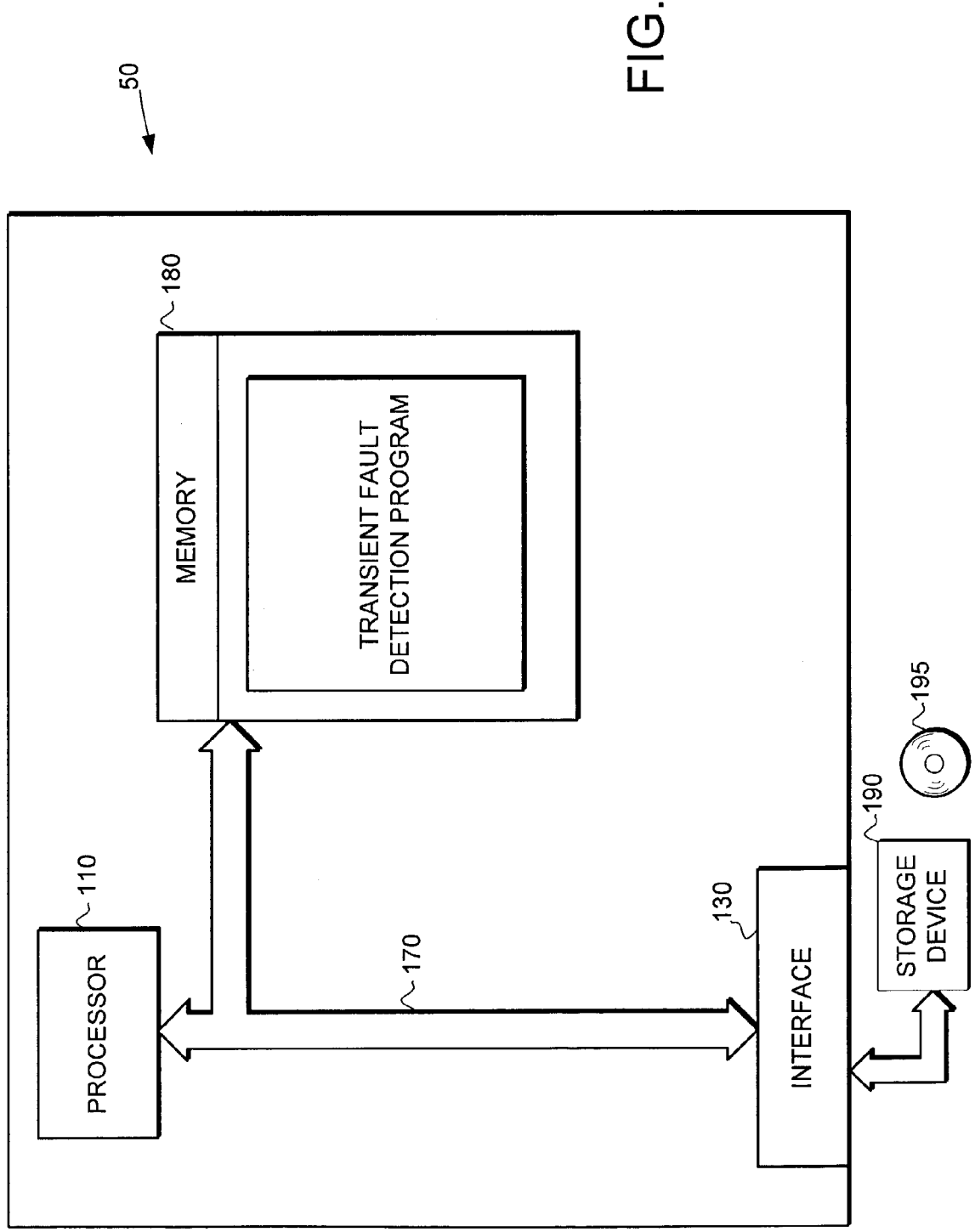
FIG. 11 is a schematic view of a computer system that includes a transient fault detection program.

The transient fault detection system and method can be implemented in wide variety of platforms. Turning now to FIG. 11, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a transient fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 11, storage device 190 can comprise a disc drive device that uses discs 195 to store data.

In accordance with the preferred embodiments of the invention, the computer system 50 includes the transient fault detection program. Specifically during operation, the transient fault detection program is stored in memory 180 and executed by processor 110. When being executed by the processor 110, the transient fault detection system monitors vehicle operation parameters to identify potential transient faults.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a transient fault detection system and method that provides improved performance. The transient fault detection system provides the ability to detect symptoms of fault in engine that occur in transient conditions. The transient fault detection system includes a feature extractor that measures sensor data during transient conditions and extracts salient features from the measured sensor data. The extracted salient features are passed to a classifier that analyzes the extracted salient features to determine if a fault has occurred during the transient conditions. Detected faults can then be passed to a diagnostic system where they can be passed as appropriate to maintenance personnel.

The transient fault detection system and method is particular applicable to fault detection in turbine engines that occur during startup. In this application, the transient fault detection system monitors turbine engine sensor data during engine startup. The turbine engine sensor data from the engine startup is passed to the feature extractor. The feature extractor extracts salient features from the turbine engine sensor data. This extraction reduces the original turbine sensor data into a substantially reduced set of variables that can be used to detect startup failure. The extracted salient features are then passed to the classifier. The reduced set of variables in the extracted salient features allows the classifier to efficiently analyze the data for symptoms of startup failure and accurately classify the performance of the turbine engine during start up. Thus, the transient fault detection system provides improved fault detection for transient engine conditions.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A transient fault detection system for detecting transient faults in a turbine engine, the transient fault detection system comprising:
   a) a feature extractor, the feature extractor receiving measured turbine sensor data from the turbine engine during a transient condition, the feature extractor performing a principal component analysis, the principal component analysis extracting salient features from the measured turbine sensor data by transforming the measured sensor data into a substantially smaller set of uncorrelated variables; and
   b) a classifier, the classifier receiving the extracted salient features and analyzing the extracted salient features to determine if a fault occurred during the transient condition, and wherein the classifier comprises a multilayer perceptron neural network classifier.

2. The system of claim 1 wherein the neural network classifier is trained using a leave-one out method.

3. The system of claim 1 wherein the neural network classifier is trained using sensor data including a plurality of known good transient condition data sets and a plurality of known bad transient condition data sets.

4. The system of claim 1 wherein the feature extractor extracts principal components selected to improve performance of the classifier.

5. The system of claim 1 wherein tile sensor data comprises engine speed.

6. The system of claim 1 wherein the sensor data comprises exhaust gas temperature.

7. The system of claim 1 wherein the transient condition comprises turbine engine startup.

8. An apparatus comprising:
a) a processor;
b) a memory coupled to the processor;
c) a transient fault detection program residing in the memory and being executed by the processor, the transient fault detection program including:
i) a feature extractor, the feature extractor receiving measured turbine sensor data from the turbine engine during a transient condition, the feature extractor performing a principal component analysis, the principal component analysis extracting salient features from the measured turbine sensor data, by transforming the measured sensor data into a substantially smaller set of uncorrelated variables; and
ii) a classifier, the classifier receiving the extracted salient features and analyzing the extracted salient features to determine if a fault occurred during the transient condition, and wherein the classifier comprises a multilayer perceptron neural network classifier.

9. The apparatus of claim 8 wherein the neural network classifier is trained using a leave-one out method.

10. The apparatus of claim 8 wherein the neural network classifier is trained using sensor data including a plurality of known good transient condition data sets and a plurality of known bad transient condition data sets.

11. The apparatus of claim 8 wherein the feature extractor extracts principal components selected to improve performance of the classifier.

12. The apparatus of claim 8 wherein the sensor data comprises engine speed.

13. The apparatus of claim 8 wherein the sensor data comprises exhaust gas temperature.

14. The apparatus of claim 8 wherein the transient condition comprises turbine engine startup.

15. A program product comprising:
a) a transient fault detection program, the transient fault detection program including:
i) a feature extractor, the feature extractor receiving measured turbine sensor data from the turbine engine during a transient condition, the feature extractor performing a principal component analysis, the principal component analysis extracting salient features from the measured turbine sensor data, by transforming the measured sensor data into a substantially smaller set of uncorrelated variables; and
ii) a classifier, the classifier receiving the extracted salient features and analyzing the extracted salient features to determine if a fault occurred during the transient condition, and wherein the classifier comprises a multilayer perceptron neural network classifier; and
b) computer-readable signal bearing media bearing said program.

16. The program product of claim 15 wherein the computer-readable signal bearing media comprises recordable media.

17. The program product of claim 15 wherein the computer-readable signal bearing media comprises transmission media.

18. The program product of claim 15 wherein the neural network classifier is trained using a leave-one out method.

19. The program product of claim 15 wherein the neural network classifier is trained using sensor data including a plurality of known good transient condition data sets and a plurality of known bad transient condition data sets.

20. The program product of claim 15 wherein the feature extractor extracts principal components selected to improve performance of the classifier.

21. The program product of claim 15 wherein the sensor data comprises engine speed.

22. The program product of claim 15 wherein the sensor data comprises exhaust gas temperature.

23. The program product of claim 15 wherein the transient condition comprises turbine engine startup.

24. A method of detecting faults in transient conditions in a turbine engine, the method comprising the steps of:
a) receiving measured turbine sensor data from the turbine engine during a transient condition;
b) extracting salient features from the measured turbine sensor data by performing a principal component analysis on the measured sensor data, the principal component analysis transforming the measured sensor data into a substantially smaller set of uncorrelated variables; and
c) classifying the extracted salient features with a multilayer perceptron neural network to determine if a fault occurred during the transient condition.

25. The method of claim 24 further comprising the step of training the neural network classifier using a plurality of known good transient condition data sets and a plurality of known bad transient condition data sets.

26. The method of claim 25 wherein the step of training the neural network classifier comprises training using a leave-one out method.

27. The method of claim 24 where the step of extracting salient features comprises extracting principal components selected to improve performance of the classifying step.

28. The method of claim 24 wherein the sensor data comprises engine speed.

29. The method of claim 24 wherein the sensor data comprises exhaust gas temperature.

30. The method of claim 24 wherein the transient condition comprises turbine engine startup.

* * * * *